United States Patent [19]

Bergstedt

[11] 4,182,354
[45] Jan. 8, 1980

[54] METHOD AND APPARATUS FOR FLOW DIVERSION IN A HIGH PRESSURE FLUID DELIVERY SYSTEM

[75] Inventor: Donald C. Bergstedt, Petaluma, Calif.
[73] Assignee: U.S. ParaPlate Corporation, Sunnyvale, Calif.
[21] Appl. No.: 902,148
[22] Filed: May 2, 1978
[51] Int. Cl.² .......................................... F16K 31/363
[52] U.S. Cl. ............................. 137/10; 137/117; 239/126; 417/299; 417/300
[58] Field of Search ................ 137/115, 116, 117, 10; 239/126; 417/299, 300

[56] References Cited

U.S. PATENT DOCUMENTS

| 1,280,477 | 10/1918 | Hopkins | 417/299 |
| 2,609,829 | 9/1952 | Davies | 137/117 |
| 3,786,828 | 1/1974 | Krechel | 137/116 |
| 3,827,827 | 8/1974 | Hill | 137/116 |

FOREIGN PATENT DOCUMENTS 915075 1/1963 United Kingdom ............... 239/126

Primary Examiner—Robert G. Nilson
Attorney, Agent, or Firm—Bertram I. Rowland

[57] ABSTRACT

A method and apparatus for the diversion of fluid flow at reduced pressure out of a high pressure fluid delivery system when the discharge of the system is closed. A bypass valve having a movable piston oriented transverse to the flow direction and a slidable seal oriented parallel to the flow direction is located between the system pump and discharge. The movable piston has two working surfaces of different areas which define planes parallel to the flow direction so that the working surfaces and therewith the piston are generally responsive only to static fluid pressure. The slidable seal is responsive to dynamic fluid pressure so that when the discharge is closed and the dynamic fluid pressure thereby reduced, the seal moves to interrupt fluid communication between the two working surfaces of the piston. Interruption of fluid communication between the two working surfaces allows for a static fluid pressure differential on the two working surfaces which moves the piston and opens the bypass valve so that the flow of fluid is diverted out of the system at a substantially reduced pressure.

29 Claims, 3 Drawing Figures

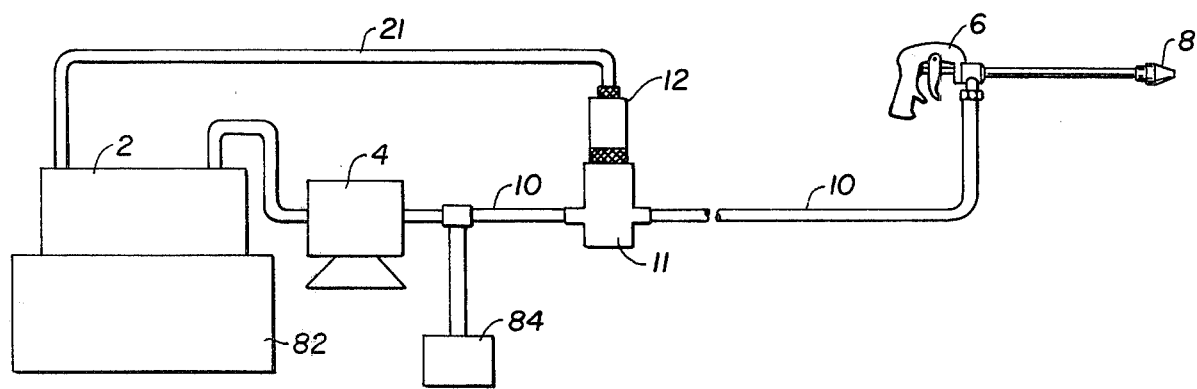
FIG._1.

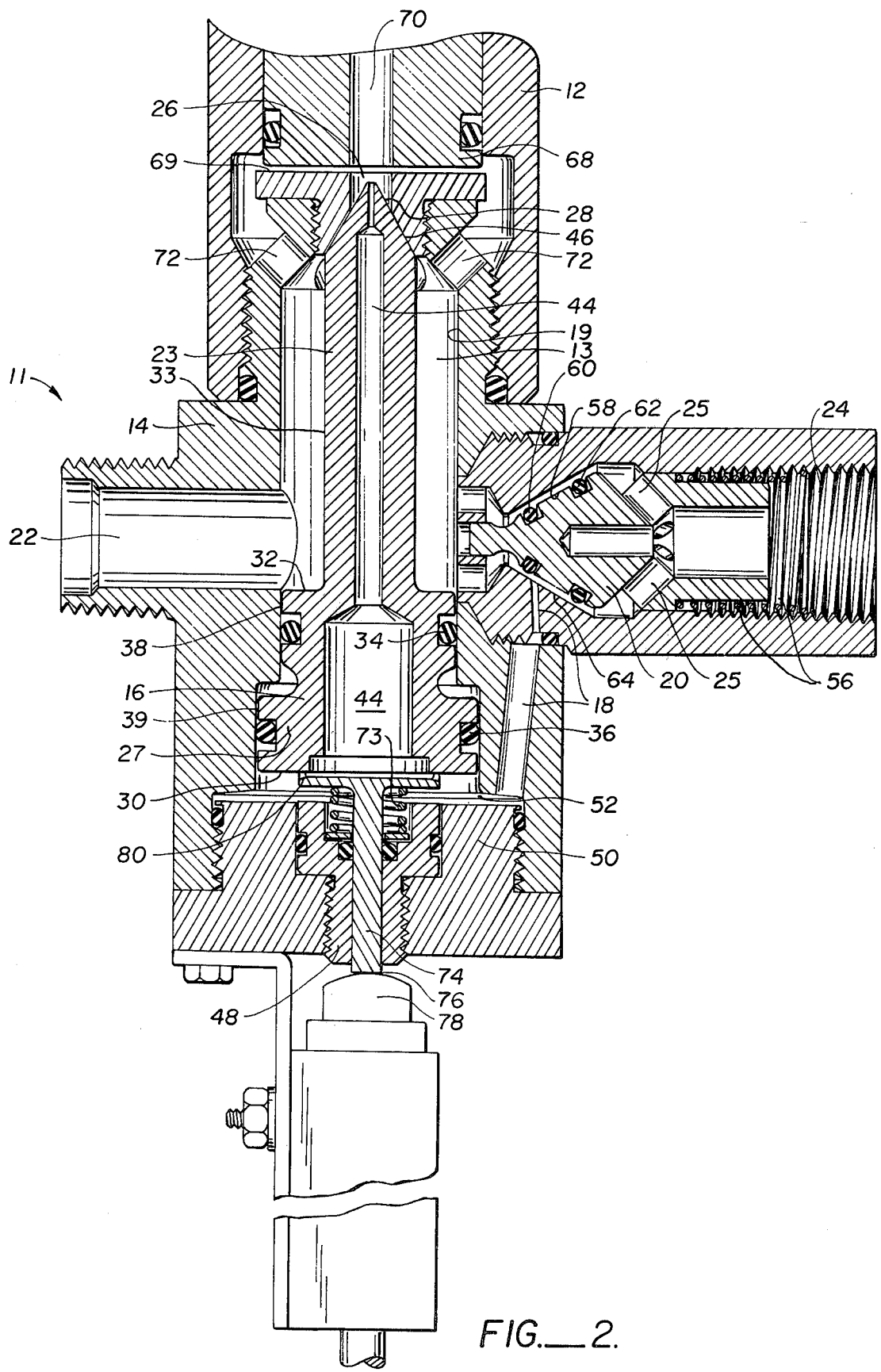
FIG._2.

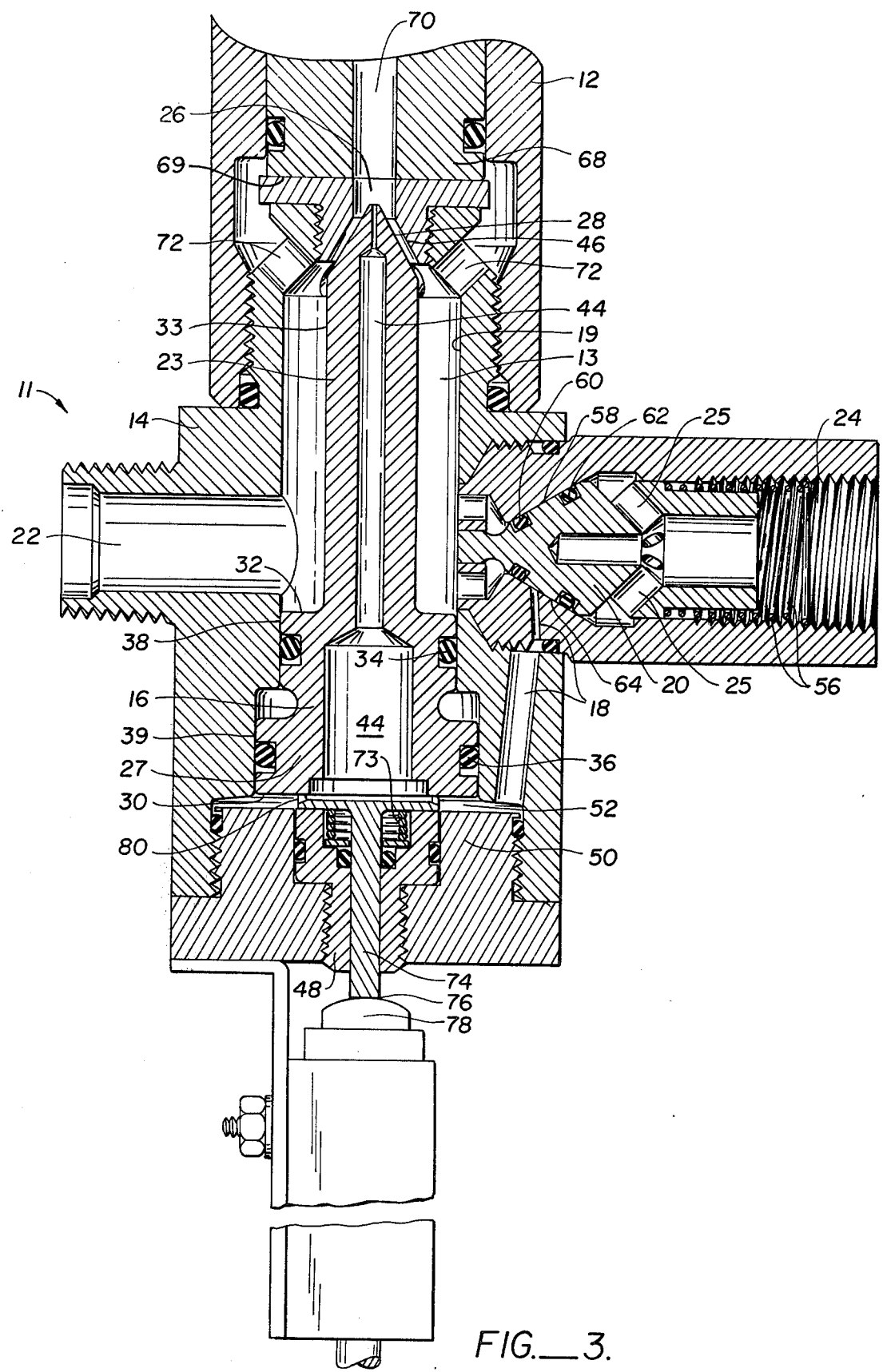
FIG._3.

METHOD AND APPARATUS FOR FLOW DIVERSION IN A HIGH PRESSURE FLUID DELIVERY SYSTEM

BACKGROUND OF THE INVENTION

This invention relates to a pressurized fluid delivery system in which fluid is pumped under relatively high pressure from a supply to a discharge, and more specifically to a method and apparatus for diverting the flow of fluid from the delivery system at a substantially reduced pressure when the discharge is closed.

In conventional pressurized fluid delivery systems, a fluid, e.g. water, is pumped from a supply, such as a tank, at a generally constant volumetric flow rate. The pressurized fluid is transported through a conduit to a discharge having a small opening where it exits at a relatively high velocity. A typical fluid delivery system of this type is in use in commercial car washes. In such fluid delivery systems, the pump operates generally at a constant velocity and thus pumps fluid from the supply at a generally constant volumetric flow rate. It is thus necessary to divert the flow of fluid when the discharge is closed in order to prevent adverse pressure build up within the system.

Conventional devices for diverting the flow when the discharge is closed are pressure-sensitive devices which are activated by the sudden pressure rise caused by the closing of the discharge. These conventional bypass valves utilize the pressure rise to move a movable check valve, such as a ball or piston, to thereby open a bypass port and allow the flow to be diverted to a drain, e.g. a conduit connected back to the fluid supply. In some versions of these bypass valves, the pressure rise moves an intermediate member, such as a diaphragm or plunger, which in turn moves the check valve to open the bypass port. When the flow is thus diverted, since the opening of the bypass port is generally substantially larger than the small opening of the discharge, the pressure flowing from the pump through the bypass valve, out the bypass port and back to the drain or supply is flowing at a substantially reduced pressure than would otherwise exist if the flow were through the discharge.

The conventional bypass valves have several inherent disadvantages. The primary disadvantage is that the movable check valve does not move until the pressure within the system reaches an extremely high value, for example several times the pressure for which the system is designed to operate. This high pressure produces adverse stresses both on seals within the system and on the pump. A second disadvantage in some types of conventional bypass valves is that a high pressure is required not only to activate the check valve but also to keep the check valve open so that fluid may be diverted to the bypass port. Thus it is necessary that there be a perfect seal around both the check valve and the discharge so that a high pressure is maintained within the bypass valve. Otherwise, any leaking of fluid out the discharge or past the check valve will decrease the pressure and cause the check valve to reseat, thereby closing the bypass port and redirecting the flow out the discharge.

SUMMARY OF THE INVENTION

The present invention provides a method and apparatus for diverting the flow of fluid in a pressurized fluid delivery system whereby flow is diverted at reduced pressure merely in response to the cessation of flow out the discharge and regardless of the pressure within the system.

A typical high pressure fluid delivery system involves a supply, such as a tank, a means for introducing the fluid from the supply into the system at a relatively high pressure, e.g. a pump, a conduit system, and a nozzle for discharging the pressurized fluid at a relatively high velocity. The present invention provides a flow diversion means located between the pump and discharge for diverting the flowing fluid out of the system at a substantially reduced pressure when the discharge is closed.

The means for diverting the flow is a bypass valve which comprises generally a housing having an inlet, an outlet, and a bypass port between the inlet and outlet. Located within the housing and movable generally transverse to the direction of flow from the inlet to the outlet is a piston for blocking the bypass port. The piston has at least two working surfaces of different areas which define planes generally parallel to the direction of flow of the fluid from the inlet to the outlet. Because the working surfaces are generally parallel to the direction of flow when the discharge is open, the working surfaces and therewith the piston are responsive generally only to the static pressure of the flowing fluid, and not to dynamic pressure. Accordingly, when the discharge is open and fluid is flowing from the pump to the inlet side of the bypass valve, past the piston, through the outlet side of the valve, and out the discharge, the static fluid pressure on each of the working surfaces is generally equal. However, since one of the working surfaces has an area greater than the other, the force acting on the larger working surface exceeds the force acting on the smaller working surface thereby forcing the piston to block the bypass port. Fluid is therefore directed out the discharge and is prevented from passing through the bypass port.

Also located within the bypass valve is a channel which provides fluid communication between the two working surfaces. The larger working surface and a portion of the housing define a chamber which is in fluid communication by means of the channel with the smaller working surface and the flowing fluid. Located within the housing proximate the outlet are means for obstructing the channel and thus interrupting fluid communication between the working surfaces. This interrupting means comprises generally a slidable seal responsive to the dynamic pressure of the flowing fluid and resilient means, e.g. a spring, for urging the seal to obstruct the channel when the discharge is closed. Thus, with the discharge open, the dynamic pressure of the fluid flowing through the outlet forces the slidable seal away from the channel and thereby compresses the spring. The fluid flows around the slidable seal, out the bypass valve outlet and out the discharge. When the discharge is closed, the flow of fluid ceases and the dynamic pressure drops essentially to zero, thereby presenting equal fluid pressure on both sides of the slidable seal. However, because the compressed spring is now acting on one side of the slidable seal, that spring forces the slidable seal against the channel thereby interrupting fluid communication between the two working surfaces of the piston.

It should be apparent that with the discharge closed, fluid communication between the two working surfaces obstructed, and the pump continuing to pump fluid from the supply through the system under pressure, the fluid pressure acting on the smaller working surface slowly begins to increase. Additionally the fluid within the chamber is passed out of the system and thus the fluid pressure on the larger working surface decreases. Accordingly, the force acting on the smaller working surface of the piston exceeds the force acting on the larger working surface and the piston is moved away from the bypass port to permit the flow of fluid out of the fluid delivery system at a substantially reduced pressure.

Means are provided for adjusting the maximum travel of the movable piston and thus for varying the area of the opening of the bypass port. The pressure of the fluid flowing out the bypass port is directly related to the area of the opening and thus the piston travel adjusting means allows preselection of the fluid pressure of the diverted flow. The present invention thus does not rely on a sudden pressure rise caused by closing the discharge to force open a diaphragm or plunger and there is no requirement that the pressure remain high in order to maintain the bypass port open. Rather, it is the cessation of flow and the decrease in dynamic pressure which activates the slidable seal to obstruct the channel and thereby permit the piston to move away from the bypass port.

When the closed discharge is opened, fluid again flows through the outlet of the bypass valve and the dynamic pressure of the flowing fluid forces the slidable seal to compress the spring to thereby again provide fluid communication between the working surfaces of the piston. Thus again the larger working surface of the piston has applied to it a greater force than the smaller working surface and the piston will move in the opposite direction to close the bypass port and stop the diversion of fluid out of the system.

Means are also provided with the present invention for sensing the position of the movable piston to thereby indicate whether the fluid is flowing through the discharge or through the bypass port. By sensing the position of the piston, for example with a micro-switch mechanically coupled to the piston, it is thus possible to generate an electrical signal which activates a fluid heater, such as a water heater, a warning light, or any other control device, such as a chemical injection system. Thus, if hot water is being delivered through the system, the micro-switch turns off the hot water heater when the water is being diverted. Or, if a chemical is being injected into the fluid, the micro-switch turns off the injection system when the flow is being diverted.

The present invention also provides means for permitting use of the flow diversion device in fluid delivery systems in which the fluid pressure is regulated. Applicant is co-inventor of a pressure regulator, disclosed in U.S. Pat. No. 3,856,043, which maintains fluid pressure within predetermined limits in high pressure fluid delivery systems employing closable discharges. The present invention, which is adaptable for use with such a pressure regulator, permits fluid pressure to be regulated when the discharge is open and the bypass port is blocked, and also permits the flow to be diverted through the bypass port and pressure regulator when the bypass port is open and the pressure regulator is not functioning.

The novel features which are believed to be characteristic of the invention, together with objects and advantages thereof, will be better understood from the following description considered in connection with the accompanying drawings in which preferred embodiments of the invention are illustrated by the way of example. It is to be expressly understood, however, that the drawings are for the purpose of illustration and description only and are not intended as a definition of the limits of the invention.

BRIEF DESCRIPTION OF THE DRAWINGS

FIG. 1 is a view of a typical pressurized fluid delivery system.

FIG. 2 is a view of the pressure regulator and bypass valve when the discharge is open and the bypass port is blocked.

FIG. 3 is a veiw of the pressure regulator and bypass valve when the discharge is closed and the bypass port is unblocked.

DESCRIPTION OF THE PREFERRED EMBODIMENTS

Referring first to FIG. 1, the present invention provides a method and apparatus for operating a fluid delivery system of the type having a fluid supply 2, a pump 4 for introducing fluid from the supply 2 under pressure, a closable discharge 6, such as a hand-held gun having an outlet nozzle 8, and conduit 10 interconnecting the supply 2, pump 4 and discharge 6. In such a system, fluid is introduced from the supply 2 under pressure into the conduit 10 and out the nozzle 8. The pump 4 pumps fluid at a generally constant volumetric flow rate, and may be any type of conventional pump, such as a piston, vane, or centrifugal type pump.

In the operation of such a fluid delivery system, it is necessary to divert the flow out of the system, e.g. through a drain back to the supply 2, when the discharge 6 is closed, so as to prevent adverse pressure build up within the system. It is desirable to divert the flow at a pressure substantially less than the pressure within the system when the discharge 6 is open, since by so doing the pump 4 operates under less load and thereby requires less energy.

In conventional fluid delivery systems of this type, it is also common to regulate the pressure within the system when the flow is out the discharge 6 to prevent pressure pulsations within the system caused by piston-type pumps. One such type of pressure regulator, of which applicant is co-inventor, is disclosed in U.S. Pat. No. 3,856,043. This pressure regulator 12 operates to relieve transient pressure rises within the system by directing a portion of the fluid within the system out of the system through the pressure regulator 12 and out a drain, e.g. a conduit 21 connected back to the supply 2. Thus in operation, this type of pressure regulator 12 effectively removes a small amount of fluid each time it senses a pressure rise within the system.

The present invention provides a method and apparatus for operating a fluid delivery system of the above-described type, and specifically a method and apparatus for diverting the flow out of the system at substantially reduced pressure when the discharge 6 is closed. Referring to FIGS. 2 and 3, the invention is a bypass valve 11 which comprises generally a housing 14, a movable piston 16, a channel 18 within the housing 14, and a slidable seal 20.

The bypass valve 11 is one component of the fluid delivery system shown in FIG. 1. The housing 14 of the bypass valve 11 has a central cavity 13, an inlet 22 which is connected to the pump 4 by conduit 10, and an outlet 24 which is connected to the discharge 6 by conduit 10. A bypass port 26 preferably opens directly into the center of the pressure regulator 12, or if there is no pressure regulator located proximate the bypass valve 11, the bypass port 26 is connected directly to a drain, e.g. conduit 21 which leads back to the supply 2.

Located within the housing 14 are a movable bypass port blocking means, e.g. a piston 16, and a slidable seal 20. The movable piston 16 has a central cylindrical portion 23 which has a diameter sufficiently less that the diameter of the wall 19 of the central cavity 13 so that fluid may freely pass the piston 16 from the inlet 22 to the outlet 24. The slidable seal 20 is designed so that fluid may flow around it and through a plurality of apertures 25 within it to the outlet 24. Thus neither the piston 16 nor the slidable seal 20 hinders the flow of pressurized fluid from the pump 4 to the discharge 6.

The piston 16 is a shaft-like structure having an enlarged diameter portion 27 at one end, a central cylindrical portion 23, and a conically shaped sealing means 28 at the other end. The conical sealing means 28 seals off bypass port 26 when it is seated within the complementarily shaped piston seat 46 located proximate the bypass port 26. The enlarged diameter portion 27 is bounded by two working surfaces 30 and 32. The working surface 30 has a larger effective area than the working surface 32. The two working surfaces 30 and 32 are separated from one another and generally permanently sealed from one another by "O" rings 34 and 36. The "O" rings 34 and 36 are between the outer walls 38 and 39 of the enlarged portion 27 of piston 16 and the wall 19 of the central cavity 13. A channel 18 within the housing 14 provides fluid communication between the two working surfaces 30 and 32.

The working surfaces 30 and 32 and therewith the piston 16 are responsive to fluid pressure within the fluid delivery system generally and within the bypass valve 11 specifically. The larger working surface 30 has an effective area generally equal to the circular area of the end of the piston. The smaller working surface 32 has an area generally equal to the area of the annular surface defined by an outer wall 38 of enlarged diameter portion 27 and the outer wall 33 of the cylindrical portion 23. The piston 16 is positioned within the central cavity 13 of housing 14 and is movable therein only in a direction generally transverse to the direction of flow from the inlet 22 to the outlet 24. Because the piston 16 is restrained from motion in other directions, only the fluid pressure within the bypass valve 11 which acts on the working surfaces 30 and 32 is effective to move the piston in either direction. Within the center of the piston 16 is an opening or passage 44 which provides fluid communication between the larger working surface 30 and the bypass port 26. Also located within the housing is piston travel adjustor 48 for varying the distance which the piston 16 may travel. Thus the limits of piston travel or motion are generally defined by the distance which the seat 46 and the adjustor 48 are separated. A portion of the central cavity 13 generally defines a chamber 52 which is in fluid communication, by means of channel 18, with another portion of the central cavity 13 and with smaller working surface 32 when the discharge 6 is open.

The slidable seal 20 is located within the outlet 24 of the housing 14 and is movable therein. The slidable seal is oriented axially generally in the direction of flow through the bypass valve 11 from the inlet 22 through the outlet 24. The slidable seal 20 has a plurality of apertures 25 for permitting the passage of fluid around the slidable seal 20 and out the outlet 24 towards the discharge 6. The slidable seal 20 is acted upon by resilient means, e.g. spring 56, which moves it in the direction opposite to the direction of fluid flow from the inlet 22 towards the outlet 24. The slidable seal 20 has a conically shaped end 58 on which are located "O" rings 60 and 62. The slidable seal 20 is limited in its movement within the bypass valve 11 by the housing interior wall 64. The two "O" rings 60 and 62 are spaced on the conically shaped end 58 of the slidable seal 20 so that when the slidable seal 20 is at its innermost position so as to contact the interior wall 64 of the housing 14, the two "O" rings 60 and 62 are on opposite sides of the channel 18.

The pressure regulator 12, which is fully disclosed in U.S. Pat. No. 3,856,043, comprises generally a movable plate 68 having a central orifice 70. The movable plate 68 is restrained by springs (not shown) and is sensitive to fluid pressure within the fluid delivery system. When the pressure exceeds a predetermined level, the plate 68 moves away from surface 69 and bypass port 26 so as to permit the passage of a small amount of fluid between plate 68 and surface 69, through the orifice 70, and back through conduit 21 to the supply 2. Thus when the discharge 6 is open and the fluid pressure is being continually regulated by the regulator 12, fluid is intermittently passing through the orifice 70 in response to transient pressure rises such as those caused by the piston action of the pump 4. When the discharge 6 is open and bypass port 26 blocked, the housing 14 permits fluid communication between the bypass valve 11 and the pressure regulator 12 by means of a plurality of openings 72.

The invention as thus described can be better understood by considering the function of the component parts in operation. Referring first to FIG. 2, which illustrates the position of the component parts of both the bypass valve 11 and the pressure regulator 12 when the discharge 6 is open, the sealing means 28 of the piston 16 is seated within the piston seat 46 proximate the bypass port 26 so that the bypass port 26 is blocked. Thus with the discharge 6 open fluid passes into the inlet 22 of the housing 14, is in fluid communication with plate 68 of the pressure regulator 12 by means of the plurality of openings 72, and passes out the outlet 24 to the discharge 6. While fluid is flowing in such a manner with the discharge 6 open, the fluid pressure within the system is continually regulated by means of the pressure regulator 12 and small amounts of fluid are intermittently passing through openings 72, between plate 68 and surface 69 and out orifice 70 in response to transient pressure rises. When fluid is flowing through the bypass valve 11 and out the discharge 6, the slidable seal 20 is forced away from the channel 18 by the dynamic pressure of the flowing fluid and compresses the spring 56. Because the discharge 6 is open and the dynamic pressure of the flowing fluid forces the slidable seal 20 away from the channel 18 in such a manner, there is continual fluid communication by means of channel 18 between the two working surfaces 30 and 32. Because of such fluid communication and because the working surface 32 defines a plane generally parallel to the direction of flow of fluid so that the working surface 32 is thus responsive only to the static pressure of the flowing fluid, the fluid pressure on both working surfaces 30 and 32 is generally equal. However, working surface 30 has a greater effective area than working surface 32 and thus the component fluid force acting on working surface 30 substantially exceeds the oppositely acting force on the working surface 32. Accordingly, the piston 16 is thus forced in position so that the sealing means 28 is seated within the piston seat 46 thereby blocking bypass port 26 and preventing any bypass of fluid through bypass port 26. Even though bypass port 26 is blocked by the sealing means 28, the plurality of openings 72 located proximate the bypass port 26 permit fluid communication between the bypass valve 11 and the regulator 12 so that fluid may pass between plate 68 and surface 69 and out through the orifice 70 of the regulator 12 as the fluid pressure is continually regulated within the system. Even though the discharge 6 is open and bypass port 26 is blocked, an extremely minute flow of fluid is passing from chamber 52 through passage 44 in piston 16 and out the bypass port 26.

Referring now to FIG. 3, the operation of the bypass valve 11 to divert the flow at a substantially reduced pressure can be better understood. When the discharge 6 is closed the flow of fluid through the bypass valve 11 is effectively stopped and thus the dynamic pressure acting on the slidable seal 20 is substantially reduced, essentially to zero. Thus the only forces acting on the slidable seal 20 when the discharge 6 is closed are the force caused by static fluid pressure and the spring force. Since fluid can pass freely on either side of the slidable seal 20 because of the apertures 25, the forces caused by the static pressure of the fluid are generally equal on both sides of the slidable seal 20. Thus the spring force is the determining force acting on the slidable seal 20. Because the spring 56 was compressed when the slidable seal 20 was biased away from the channel 18 by the dynamic pressure of the flowing fluid, this compressed spring force acts to now urge the slidable seal 20 against the interior wall 64 of the housing to thereby interrupt fluid communication between the two working surfaces 30 and 32 provided by the channel 18.

With the channel 18 thus obstructed by the slidable seal 20, fluid communication between the two working surfaces 30 and 32 is interrupted and the fluid pressure acting on the two working surfaces 30 and 32 is now not necessarily equal. Bearing in mind that the pump 4 is continuing to introduce fluid under pressure into the system despite the fact that the discharge 6 is closed, the fluid pressure within the bypass valve 11 begins to increase. At the instant the discharge 6 is closed, the sudden pressure rise within the bypass valve 11 causes the plate 68 of regulator 12 to move away from surface 69 to thereby allow flow of fluid out orifice 70. Also, the pressure on smaller working surface 32 begins to increase. Since the channel 18 is obstructed and since the fluid within the chamber 52 is under pressure, the fluid within the chamber 52 passes out the passage 44 and out the bypass port 26. Thus when discharge 6 is closed, not only does the pressure on the smaller working surface 32 increase, but the pressure on the larger working surface 30 decreases. The effect is that even though the two working surfaces 30 and 32 have substantially different effective areas upon which the fluid pressure acts, the fluid pressure is substantially greater upon the smaller working surface 32 than upon the larger working surface 30 and thus the resultant force pushes the piston away from the piston seat 46 and the bypass port 26 to thereby open bypass port 26. When the piston is in such a position, as shown in FIG. 3, fluid now passes from the inlet 22 past the sealing means 28, out the bypass port 26, through the regulator 12 and back to the supply 2. Because the area of the opening of the bypass port 26 is significantly greater than the area of the opening of the nozzle 8, the fluid which is thereby diverted out the bypass port 26 flows at a substantially reduced pressure, thereby allowing the pump 4 to operate under less of a load with less demand for energy.

The fluid pressure of the diverted flow may be altered by varying the adjustor 48 which varies the travel of the piston 16 and thus the effective area of the opening between sealing means 28 and piston seat 46. When the discharge 6 is closed and the piston 16 is in position as shown in FIG. 3, the pressure regulator 12 is essentially non-functional since all of the fluid from the pump is now directed through the bypass port 26 at substantially reduced pressure. The plate 68 rests on surface 69 and none of the fluid passes through the plurality of openings 72 within the housing 14.

Means are provided with the present invention for sensing the position of the piston 16 within the housing 14. Located within the housing 14 and projecting through the adjustor 48 is a plunger 74 which is movable within the adjustor 48. The lower tip 76 of the plunger 74 contacts a micro-switch 78. The end of the piston contacts the base 80 of the plunger 74. A spring 73 maintains the plunger 74 in contact with the base of the piston 16 regardless of the position of the piston 16. Such an arrangement of a piston position sensing means thus permits the micro-switch 78 to activate any of numerous types of devices. For example, the micro-switch 78 may be electrically coupled through a heater 82 in FIG. 1, so that when the piston 16 is not blocking the bypass port 26 and fluid is being diverted back to the supply 2, the heater 82 which heats the fluid within the supply 2 is turned off. The combination of the piston position sensing device with the heater 82 thereby saves energy since fluid which is diverted need not be reheated. Additionally, the micro-switch 78 may be electrically coupled to a chemical injection system 84 for introducing a second fluid into the system. For example, if it is desired to inject a chemical substance into the fluid, and further if the concentration of the chemical substance within the fluid must be maintained within specific limits, the injector 84 may be turned off when the bypass port 26 is open and fluid is being diverted back to the supply 2.

It should be apparent that the present invention as thus described allows for the diversion of fluid out of a pressurized fluid delivery system at a substantially reduced pressure when the discharge 6 is closed, and further that the flow diversion means does not rely upon sudden pressure rises or the maintenance of a high pressure within the system to keep the bypass valve 11 open. Rather, it is the slidable seal 20 which is responsive not to sudden pressure rises but only to the cessation of flow and thus to the absence of dynamic fluid pressure, which effectively interrupts fluid communication between two working surfaces 30 and 32 of a movable piston 16 so that static fluid pressure moves the piston 16 away from a bypass port 26 to thereby divert the fluid out of the delivery system at a reduced pressure.

Because the bypass valve 11 is responsive to flow, and specifically to the cessation of flow, it is capable of functioning in fluid delivery systems which have multiple discharges. Thus the closing of one of the discharges does not activate the bypass valve 11 to divert the flow since fluid flowing out the remaining open discharges forces the slidable seal 20 away from channel 18. In certain conventional pressure-responsive bypass valves the closing of one discharge creates a pressure rise within the system which often inadvertently opens a check valve to prematurely divert the flow.

It should also be apparent that while the specific embodiment discussed herein has related to the use of a liquid as the pressurized fluid, the present invention is fully operable if the fluid is a gas. The bypass valve will function equally as well if the fluid is a gas since the slidable seal 20 is responsive only to the dynamic pressure of the moving gas and since the two working surfaces 30 and 32 of the piston 16 are generally responsive only to the static pressure of the gas.

While the preferred embodiments of the present invention have been illustrated in detail, it should be apparent that modifications and adaptations of those embodiments will occur to those skilled in the art. However, it is to be expressly understood that such modifications and adaptations are within the sphere and scope of the present invention as set forth in the following claims.

What is claimed is:

1. A method of operating a fluid delivery system employing a pump, a closable discharge, and a bypass, the system being operable in a discharge phase during which fluid is discharged at relatively high pressure, and a bypass phase during which fluid is diverted at generally reduced pressure through a bypass, and wherein fluid flows past a movable bypass blocking means having at least two working surfaces of different areas, the method comprising the steps:

during the discharge phase opening the discharge and directing the flow of fluid to communicate with said working surfaces, whereby the bypass blocking means is held in the bypass blocking position; and during the bypass phase closing the discharge, interrupting communication between the flow of fluid and the larger working surface, and reducing the fluid pressure on the larger working surface whereby the bypass blocking means moves to the bypass open position.

2. A method according to claim 1 wherein the step of reducing the fluid pressure on the larger working surface includes the step of passing fluid from the larger working surface through the bypass.

3. A method according to claim 1 including the step of preselecting the distance the bypass blocking means moves so as to determine the fluid pressure in said system during the bypass phase.

4. A method according to claim 1 including the step of introducing a second fluid into said system when the bypass blocking means is in the bypass blocking position.

5. A method according to claim 1 including the step of heating the fluid when the bypass blocking means is in the bypass blocking position.

6. A method according to claim 1 including the step of generating an electrical signal when the bypass blocking means is in a predetermined position.

7. A method according to claim 6 including the step of introducing a second fluid into said system in response to said electrical signal.

8. A method according to claim 6 including the step of heating the fluid in response to said electrical signal.

9. A method according to claim 1 including the step of regulating the fluid pressure within predetermined pressure limits during the discharge phase.

10. A method of operating a fluid delivery system for the transfer of fluid under relatively high pressure from a supply through conduit means and out a closable discharge, wherein said fluid delivery system employs between the supply and discharge a bypass valve for diverting the flow away from the discharge under substantially reduced pressure when the discharge is closed, the bypass valve having a bypass port and a piston movable between a bypass port blocking position when the discharge is open and a bypass port open position when the discharge is closed, the piston having two generally parallel working surfaces of different areas and a passage through the length of the piston, the method comprising the steps of:

opening the discharge;

flowing the fluid over the smaller of the working surfaces in a direction generally parallel to the plane defined by the smaller working surface and therewith the piston is generally responsive only to the static pressure of the flowing fluid;

communicating the flowing fluid with the larger of said working surfaces, whereby the piston is held in the bypass port blocking position;

closing the discharge;

obstructing fluid communication between the larger working surface and the flowing fluid; and passing fluid from the larger of the working surfaces through the passage and out the bypass port, whereby the piston moves to the bypass port open position and fluid is diverted out the bypass port at a substantially reduced pressure.

11. The method according to claim 10 including the step regulating the fluid pressure within predetermined pressure limits when the discharge is open.

12. For use in a fluid delivery system wherein fluid is transported under pressure from a supply to a closable discharge, an apparatus for diverting the flow to a drain under substantially reduced pressure when the discharge is closed, the apparatus comprising:

a housing having a central cavity, an inlet for connecting said cavity to said fluid supply, an outlet for connecting said cavity to said discharge, and a bypass port for connecting said cavity to said drain;

blocking means within said cavity moving from a bypass port closed position when said discharge is open to a bypass port open position when said discharge is closed, said blocking means comprising a shaft having a sealing means at one end and at least two working surfaces of different areas proximate the other end;

means for providing fluid communication between said working surfaces;

means for interrupting fluid communication between said working surfaces; and means for reducing fluid pressure on the larger of said working surfaces, whereby said blocking means moves to the bypass port open position and flow is diverted at substantially reduced pressure.

13. Apparatus according to claim 12 wherein said fluid pressure reducing means comprises means for passing fluid from the larger of said working surfaces to said bypass port when fluid communication between said working surfaces is interrupted.

14. Apparatus according to claim 12 including at least one "O" ring between said cavity and said blocking means for preventing the leakage of fluid between said two working surfaces.

15. Apparatus according to claim 12 including means proximate said bypass port for receiving said sealing means of said bypass port blocking means.

16. Apparatus according to claim 12 wherein said fluid communication interrupting means comprises a slidable seal responsive to the dynamic pressure of flowing fluid.

17. Apparatus according to claim 16 including resilient means between said slidable seal and said discharge for urging said slidable seal to interrupt fluid communication between said working surfaces when said discharge is closed.

18. Apparatus according to claim 17 wherein said resilient means is a spring.

19. Apparatus according to claim 12 wherein said housing has a channel providing fluid communication between said working surfaces and wherein said slidable seal has a conically shaped end for obstructing said channel, and including at least one "O" ring on said conically shaped end of said slidable seal for preventing the leakage of fluid between said working surfaces when said channel is obstructed.

20. Apparatus according to claim 12 wherein said fluid delivery system has a plurality of discharges, and wherein said interrupting means includes means responsive to the closing of all of said discharges for interrupting fluid communication between said working surfaces.

21. Apparatus according to claim 12 including means for adjusting the distance said blocking means may move so as to thereby vary the pressure of the diverted fluid.

22. Apparatus according to claim 12 including means for sensing the position of said movable blocking means.

23. Apparatus according to claim 22 including means for generating an electrical signal in response to the sensed position of said movable blocking means.

24. Apparatus according to claim 23 including means for heating said fluid and means for electrically coupling said heating means to said signal generating means.

25. Apparatus according to claim 23 including means for introducing a second fluid into said fluid delivery system and means for electrically coupling said second fluid introducing means and said signal generating means.

26. A bypass valve for a pressurized fluid delivery system of the type in which fluid is transported from a fluid supply through conduit means to a closable discharge, the bypass valve being located in said fluid delivery system between the supply and discharge, said bypass valve comprising:

a housing having a central cavity, an inlet, an outlet, a bypass port between said inlet and outlet, and a channel providing fluid communication between two portions of said cavity;

a piston within said cavity movable between a bypass port closed position when said discharge is open and a bypass port open position when said discharge is closed, said piston comprising a shaft having a bypass port sealing means at one end, a first working surface at the other end, a second working surface having an area less than said first working surface and located between said ends, and a passage through the length of said shaft for passing fluid from said first working surface through said bypass port, said working surfaces of said piston generally separating said two portions of said cavity from one another; and means responsive to the dynamic pressure of the flowing fluid for obstructing said channel when said discharge is closed, whereby fluid passes from said first working surface through said passage and said bypass port, said movable blocking means moves to the bypass port open position, and fluid is diverted through said bypass port at a substantially reduced pressure.

27. Apparatus according to claim 26 wherein said channel obstructing means comprises a slidable seal and resilient means between said slidable seal and said discharge for urging said slidable seal to obstruct said channel when said discharge is closed.

28. Apparatus according to claim 26 wherein the fluid delivery system has a pressure regulator proximate said bypass valve for maintaining the pressure of flowing fluid within predetermined limits when said discharge is open, and including means for directing fluid from said bypass valve to said pressure regulator when said blocking means is in the bypass port closed position.

29. For use in a pressurized fluid delivery system employing a pump and a closable discharge an apparatus for regulating the fluid pressure when the discharge is open, and for diverting the flow of fluid out of the system at a substantially reduced pressure when the discharge is closed, the apparatus comprising in combination:

a bypass valve, said valve comprising a housing having a central cavity, an inlet, an outlet, a bypass port between said inlet and outlet for the diversion of fluid out of the fluid delivery system, and a channel for providing fluid communication between at least two portions of said cavity; a piston within said cavity for blocking said bypass port and movable from a bypass port closed position when the discharge is open to a bypass port open position when the discharge is closed, said piston having a passage throughout its length and at least two generally parallel working surfaces of different areas, said working surfaces generally dividing said cavity into said two portions; and means responsive to the dynamic pressure of the flowing fluid for obstructing said channel, said obstructing means comprising a slidable seal and resilient means for urging said slidable seal against said channel when the discharge is closed, whereby fluid from the larger working surface passes through said passage and said bypass port, said piston moves to the bypass port open position, and fluid is diverted through said bypass port at a substantially reduced pressure;

a pressure regulator connected to said bypass valve proximate said bypass port for regulating the pressure within predetermined pressure limits when said discharge is open; and means for directing fluid from said bypass valve to said pressure regulator when said discharge is open and said blocking means is in the bypass port closed position.

* * * * *